United States Patent
Choi

(10) Patent No.: US 10,459,576 B2
(45) Date of Patent: Oct. 29, 2019

(54) DISPLAY APPARATUS AND INPUT METHOD THEREOF

(71) Applicant: SAMSUNG ELECTRONICS CO., LTD., Suwon-si (KR)

(72) Inventor: Myoung Koo Choi, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/705,398

(22) Filed: Sep. 15, 2017

(65) Prior Publication Data

US 2018/0081494 A1 Mar. 22, 2018

(30) Foreign Application Priority Data

Sep. 20, 2016 (KR) .................. 10-2016-0120279

(51) Int. Cl.
| | | |
|---|---|---|
| *G06F 3/042* | (2006.01) | |
| *G06F 3/03* | (2006.01) | |
| *G06F 3/01* | (2006.01) | |
| *G06K 9/22* | (2006.01) | |
| *G06F 3/0354* | (2013.01) | |

(52) U.S. Cl.
CPC .......... *G06F 3/0425* (2013.01); *G06F 3/011* (2013.01); *G06F 3/0321* (2013.01); *G06F 3/03545* (2013.01); *G06K 9/22* (2013.01); *G06K 2009/226* (2013.01)

(58) Field of Classification Search
None
See application file for complete search history.

(56) References Cited

U.S. PATENT DOCUMENTS

| | | | |
|---|---|---|---|
| 8,428,395 B2 | 4/2013 | Matsuda | |
| 8,532,468 B2 | 9/2013 | Togo et al. | |
| 2008/0063378 A1* | 3/2008 | Togo | H04N 7/007 386/278 |
| 2009/0148059 A1* | 6/2009 | Matsuda | G06T 9/00 382/251 |

(Continued)

FOREIGN PATENT DOCUMENTS

| | | |
|---|---|---|
| EP | 2669766 A1 | 12/2013 |
| KR | 10-1418018 B1 | 7/2014 |

OTHER PUBLICATIONS

Communication issued by the International Searching Authority dated Dec. 14, 2017 in counterpart International Patent Application No. PCT/KR2017/010089 (PCT/ISA/210, PCT/ISA/220 & PCT/ISA/237).

(Continued)

*Primary Examiner* — Kenneth B Lee, Jr.
(74) *Attorney, Agent, or Firm* — Sughrue Mion, PLLC

(57) ABSTRACT

A display apparatus includes a display, a communication module that communicates with an input device, and a processor. The processor is configured to add pattern information to a first image by changing a pixel value of at least one of a plurality of pixels included in the first image, to display the first image, to which the pattern information is added, on the display, to receive a second image captured by the input device from the input device via the communication module, and to identify input coordinates of the input device or a function to be executed by the display apparatus based on pattern information included in the received second image.

18 Claims, 11 Drawing Sheets

(56) References Cited

U.S. PATENT DOCUMENTS

| | | |
|---|---|---|
| 2011/0227827 A1 | 9/2011 | Solomon et al. |
| 2012/0244940 A1 | 9/2012 | Solomon et al. |
| 2014/0118310 A1* | 5/2014 | Black .................. G06F 3/03545 |
| | | 345/178 |
| 2015/0278624 A1* | 10/2015 | Hou ...................... G06F 3/0321 |
| | | 345/179 |
| 2016/0132182 A1 | 5/2016 | Black et al. |
| 2017/0220140 A1 | 8/2017 | Black et al. |

OTHER PUBLICATIONS

Communication dated Aug. 26, 2019, issued by the European Patent Office in counterpart European Application No. 17853354.3.

\* cited by examiner

DISPLAY APPARATUS AND INPUT METHOD THEREOF

CROSS-REFERENCE TO RELATED APPLICATION(S)

This application claims priority from Korean Patent Application No. 10-2016-0120279, filed on Sep. 20, 2016 in the Korean Intellectual Property Office, the entire disclosure of which is hereby incorporated by reference.

TECHNICAL FIELD

Exemplary embodiments relate to a display apparatus which receives a user input and an input method thereof.

BACKGROUND

With the development of digital technologies, various types of electronic products are being developed and distributed. In recent years, a display apparatus such as a television (TV), a monitor, a smartphone, or the like has been increasingly distributed.

A touch screen that functions as an input device and enables input by using a finger or a pen is being applied to the display apparatus. The touch screen may use various schemes such as a resistive film scheme, an infrared scheme, a capacitive scheme, and the like.

SUMMARY

The touch screen that uses the various schemes needs a separate hardware device to recognize a touch, thereby increasing the thickness and the manufacturing cost of a display apparatus.

Aspects of the present disclosure address at least the above-mentioned problems and/or disadvantages and provide at least the advantages described below. Accordingly, an aspect of the present disclosure provides a display apparatus that enables a touch input to be made via an input device even though the display apparatus does not include a separate hardware device, and an input method thereof.

Another aspect of the present disclosure provides a display apparatus that enables a touch input to be made via an input device by adding pattern information to an image itself without degrading the quality of an image displayed in a display, not generating a separate image frame to which pattern information is added, and displaying pattern information on the display, and an input method thereof.

In accordance with an aspect of one or more exemplary embodiments, a display apparatus includes a display, a communication module that communicates with an input device, and a processor. The processor is configured to add first pattern information to a first image by changing a pixel value of at least one of a plurality of pixels included in the first image, to display the first image, to which the first pattern information has been added, on the display, to receive a second image captured by the input device from the input device via the communication module, and to identify input coordinates of the input device or a function to be executed by the display apparatus based on second pattern information included in the received second image.

In accordance with an aspect of one or more exemplary embodiments, an input method of a display apparatus includes adding first pattern information to a first image by changing a pixel value of at least one of a plurality of pixels included in the first image, displaying the first image, to which the first pattern information has been added, in a display, receiving a second image captured by an input device from the input device via a communication module, and identifying input coordinates of the input device or a function to be executed by the display apparatus based on second pattern information included in the received second image.

In accordance with an aspect of one or more exemplary embodiments, a non-transitory computer-readable recording medium has recorded thereon a program performing a method that includes adding first pattern information to a first image by changing a pixel value of at least one of a plurality of pixels included in the first image, displaying the first image, to which the pattern information has been added, in a display, receiving a second image captured by an input device from the input device via a communication module, and identifying input coordinates of the input device or a function to be executed by the display apparatus based on second pattern information included in the received second image.

Other aspects, advantages, and salient features will become apparent to persons having ordinary in the art from the following detailed description, which, taken in conjunction with the annexed drawings, discloses various exemplary embodiments of the present disclosure.

According to various exemplary embodiments, it may be possible to make a touch input via an input device even though a display apparatus does not include a separate hardware device, thereby decreasing the thickness and the manufacturing cost of the display apparatus.

According to various exemplary embodiments, it may be possible to make a touch input via an input device without degrading the quality of an image displayed in a display.

BRIEF DESCRIPTION OF THE DRAWINGS

The above and other aspects, features, and advantages of certain exemplary embodiments will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
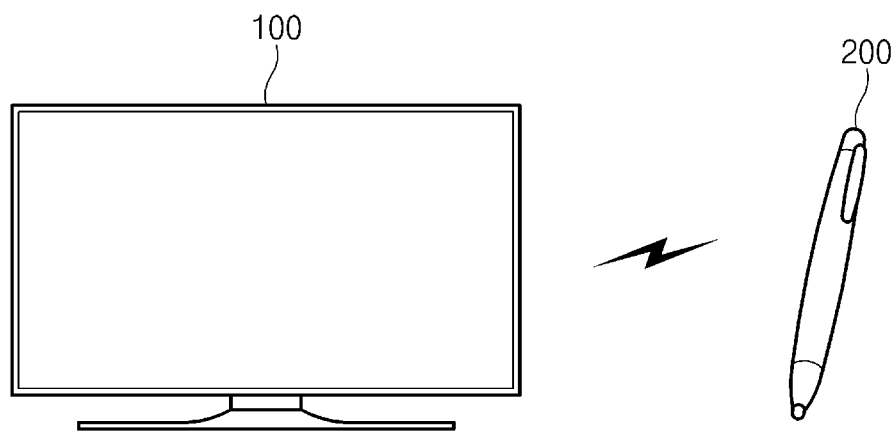
FIG. 1 is a block diagram illustrating a configuration of a display system, according to various exemplary embodiments.

Hereinafter, various exemplary embodiments may be described with reference to accompanying drawings. Accordingly, those of ordinary skill in the art will recognize that modification, equivalent, and/or alternative on the various exemplary embodiments described herein can be variably made without departing from the scope and spirit of the present inventive concept. With regard to description of drawings, similar elements may be marked by similar reference numerals.

In the present disclosure, the expressions "have", "may have", "include" and "comprise", or "may include" and "may comprise" used herein indicate existence of corresponding features (e.g., elements such as numeric values, functions, operations, or components) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like, as used in the present disclosure, may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element, or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe exemplary embodiments and are not intended to limit the scope of the present inventive concept. The terms of a singular form may include plural forms unless otherwise specified. All the terms used herein, which include technical or scientific terms, may have the same meaning that is generally understood by a person having ordinary skill in the art. It will be further understood that terms, which are defined in a dictionary and commonly used, should also be interpreted as is customary in the relevant related art and not in an idealized or overly formal unless expressly so defined in various exemplary embodiments. In some cases, even if terms are terms which are defined in the present disclosure, they may not be interpreted to exclude exemplary embodiments.

FIG. 1 is a block diagram illustrating a configuration of a display system, according to various exemplary embodiments.

Referring to FIG. 1, a display system 1000 may include a display apparatus 100 and an input device 200.

According to an exemplary embodiment, the display apparatus 100 and the input device 200 may be connected with each other by wire or wirelessly. For example, the display apparatus 100 and the input device 200 may be connected with each other via a short range wireless communication interface (e.g., Bluetooth, near field communication (NFC), wireless-fidelity (Wi-Fi), or the like).

According to an exemplary embodiment, the display apparatus 100 may display an image (e.g., a video image) in a display. According to an exemplary embodiment, the display apparatus 100 may display an image received from an external device or an image stored in an internal memory. For example, the display apparatus 100 may receive broadcast contents from a broadcast station via a broadcast network or may receive web contents from a web server via an Internet network. For another example, after being connected with the external device via a wired communication interface (e.g., high definition multimedia interface (HDMI) or digital video/visual interactive (DVI), a video graphics array (VGA), or the like) or a short range wireless communication interface (e.g., Bluetooth, NFC, Wi-Fi, or the like), the display apparatus 100 may receive an image from the external device.

According to an exemplary embodiment, the display apparatus 100 may add pattern information to the image displayed on the display. According to an exemplary embodiment, the display apparatus 100 may add pattern information to the image by changing a pixel value of at least one of a plurality of pixels included in the image. For example, the pattern information may include coordinate information for sensing input coordinates of the input device 200. For example, the pattern information may include function information that indicates information about a function (e.g., the execution of an application, the movement to a specific website, the outputting of specific sound, or the like) to be executed by the display apparatus 100.

According to an exemplary embodiment, the display apparatus 100 may be implemented with any of various devices, each of which receives contents from the external device, such as a television (TV), a desktop personal computer (PC), a notebook PC, a smartphone, a tablet PC, a monitor, an electronic picture frame, or the like, in order to display the contents.

According to an exemplary embodiment, the input device 200 may make a touch input on the display of the display apparatus 100. According to an exemplary embodiment, the input device 200 may capture an image of an area, where the touch input is made, by using a camera.

According to an exemplary embodiment, the display apparatus 100 or the input device 200 may identify coordinates of the touch input by using the pattern information included in the image captured by the input device 200. For example, the input device 200 may transmit the captured image to the display apparatus 100, and the display apparatus 100 may identify the input coordinates of the input device 200 by using the pattern information included in the image received from the input device 200. As another example, the input device 200 may detect the pattern information included in the captured image and may transmit the detected pattern information to the display apparatus 100. As another example, the input device 200 may identify input coordinates (or function information) by using the pattern information included in the captured image, and may transmit information (or function information) about the identified input coordinates to the display apparatus 100.

The display system 1000 according to various exemplary embodiments may enable the input device 200 to make the touch input even though the display apparatus 100 does not include a separate hardware device, such as a touch panel, by adding the pattern information to an image, which the display apparatus 100 displays, to identify the input coordinates by using the pattern information. The display system 1000 according to various exemplary embodiments may add the pattern information to the image itself to be displayed, without generating a separate image frame to which the pattern information is added, in order to display the pattern information on the display.

Figure 2:
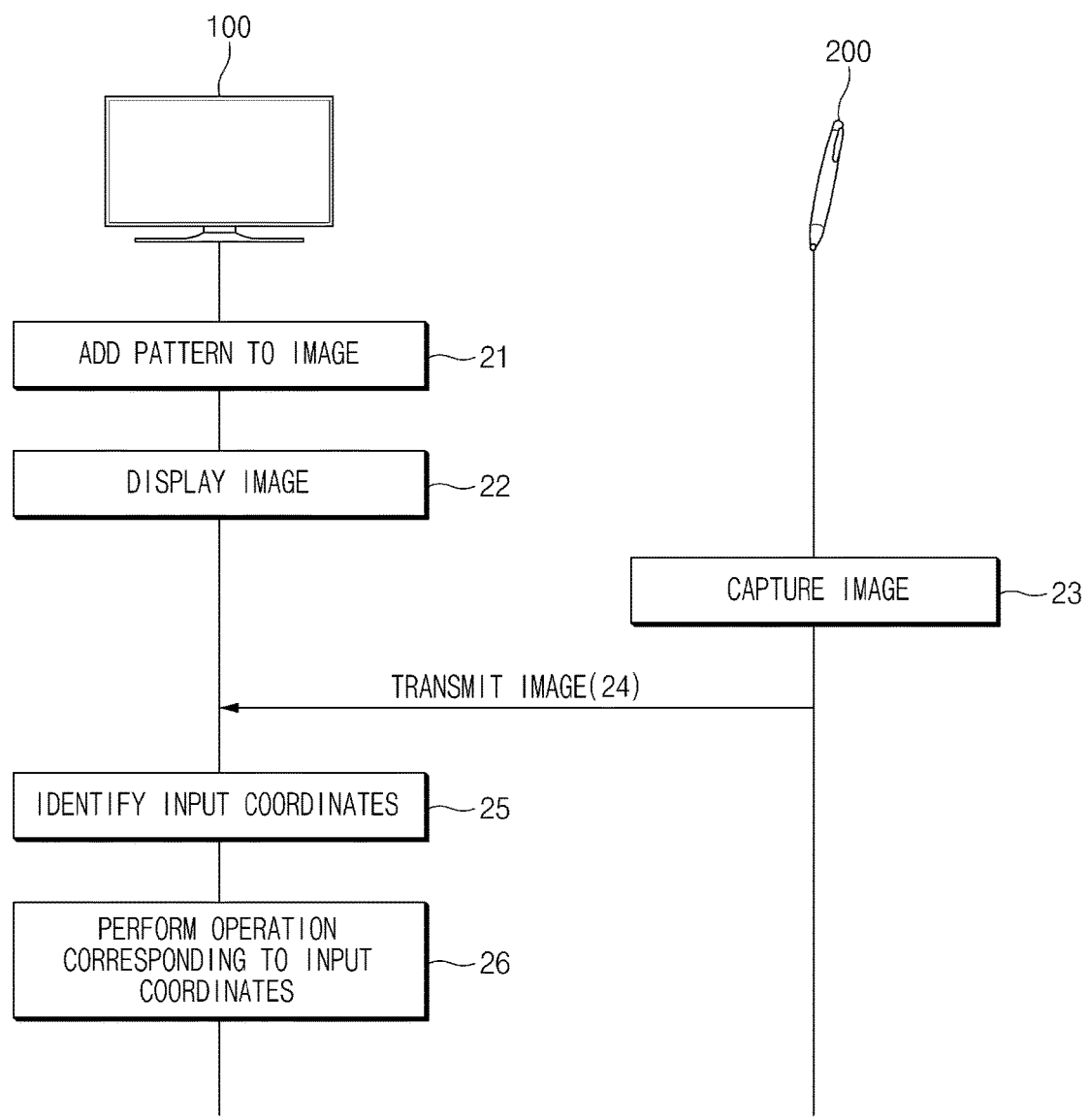
FIG. 2 is a diagram illustrating an input method of a display system, according to an exemplary embodiment.

FIG. 2 is a diagram illustrating an input method of a display system, according to an exemplary embodiment.

According to an exemplary embodiment, in operation 21, the display apparatus 100 may add pattern information to an image. According to an exemplary embodiment, the display apparatus 100 may add pattern information to the image by changing a pixel value of at least one of a plurality of pixels included in the image. According to an exemplary embodiment, the display apparatus 100 may add the pattern information to at least a part of a plurality of image frames.

According to an exemplary embodiment, in operation 22, the display apparatus 100 may display the image, to which the pattern information has been added, in a display. For example, the display apparatus 100 may display a plurality of image frames at a predetermined frame rate.

According to an exemplary embodiment, in operation 23, the input device 200 may capture the image displayed on the display. For example, if the input device 200 contacts the display or the input device 200 is placed within a specified distance from the display, the input device 200 may capture a part of the image displayed on the display.

According to an exemplary embodiment, in operation 24, the input device 200 may transmit the captured image to the display apparatus 100. For example, the input device 200 may transmit the captured image to the display apparatus 100 by wire or wirelessly. According to another exemplary embodiment, the input device 200 may detect the pattern information from the captured image and may transmit the detected pattern information to the display apparatus 100. For example, the input device 200 may transmit only information (e.g., a position of a pixel including the pattern information) about a pixel, which includes the pattern information, from among pixels included in the captured image to the display apparatus 100.

According to an exemplary embodiment, in operation 25, the display apparatus 100 may identify the input coordinates (or function information) of the input device 200 by using the pattern information included in the image received from the input device 200. For example, the display apparatus 100 may identify the input coordinates of the input device 200 based on a position of the pattern information included in the received image. As another example, the display apparatus 100 may identify the input coordinates (or function information) of the input device 200 by using the pattern information received from the input device 200.

According to an exemplary embodiment, in operation 26, the display apparatus 100 may perform an operation that corresponds to the identified input coordinates (or function information). For example, the display apparatus 100 may display a user interface that corresponds to the input coordinates (or function information), or may perform a function of the user interface that corresponds to the input coordinates (or function information). For another example, the display apparatus 100 may perform an application that corresponds to the input coordinates (or function information). As another example, the display apparatus 100 may display a written image that corresponds to the input coordinates (or function information) or may change the image displayed on the display.

Figure 3:
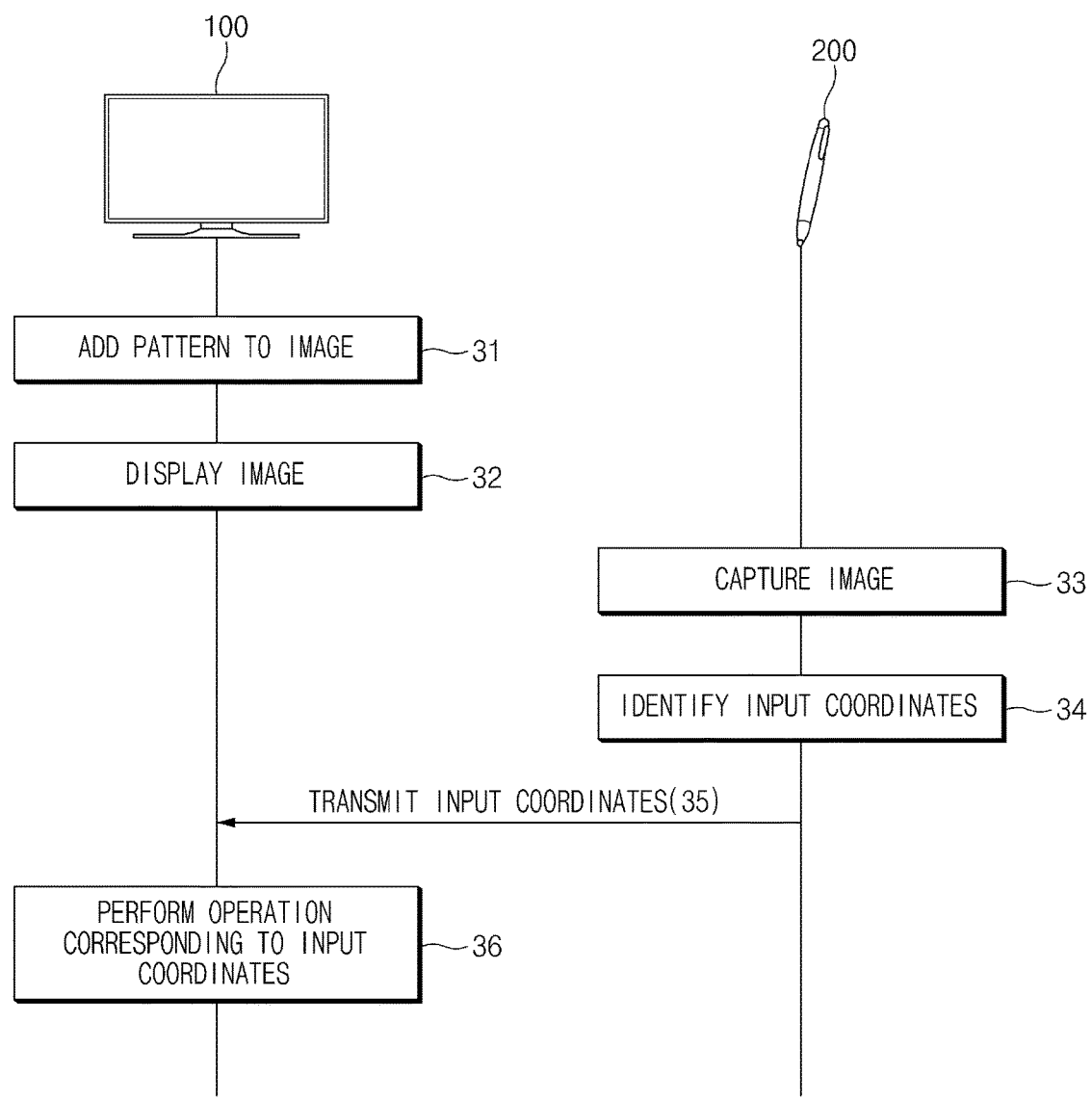
FIG. 3 is a diagram illustrating an input method of a display system, according to an exemplary embodiment.

FIG. 3 is a diagram illustrating an input method of a display system, according to an exemplary embodiment.

According to an exemplary embodiment, in operation 31, the display apparatus 100 may add pattern information to an image. According to an exemplary embodiment, the display apparatus 100 may add pattern information to the image by changing a pixel value of at least one of a plurality of pixels included in the image. According to an exemplary embodiment, the display apparatus 100 may add the pattern information to at least a subset of a plurality of image frames.

According to an exemplary embodiment, in operation 32, the display apparatus 100 may display the image, to which the pattern information has been added, in a display. For example, the display apparatus 100 may display a plurality of image frames at a predetermined frame rate.

According to an exemplary embodiment, in operation 33, the input device 200 may capture the image displayed on the display. For example, if the input device 200 contacts the display or the input device 200 is positioned within a predetermined distance from the display, the input device 200 may capture a part of the image displayed on the display.

According to an exemplary embodiment, in operation 34, the input device 200 may identify input coordinates (or function information) of the input device 200 by using the pattern information included in the captured image. For example, the display apparatus 100 may identify the input coordinates (or function information) of the input device 200 based on a position of the pattern information included in the received image.

According to an exemplary embodiment, in operation 35, the input device 200 may transmit information about the input coordinates (or function information) to the display apparatus 100. For example, the input device 200 may transmit the information about the input coordinates (or function information) to the display apparatus 100 by wire or wirelessly.

According to an exemplary embodiment, in operation 36, the display apparatus 100 may perform an operation that corresponds to the input coordinates (or function information) received from the input device 200. For example, the display apparatus 100 may display a user interface that corresponds to the input coordinates (or function information), or may perform a function of the user interface that corresponds to the input coordinates (or function information). As another example, the display apparatus 100 may perform an application that corresponds to the input coordinates (or function information). For another example, the display apparatus 100 may display a written image that corresponds to the input coordinates (or function information), or may change the image displayed on the display.

Figure 4:
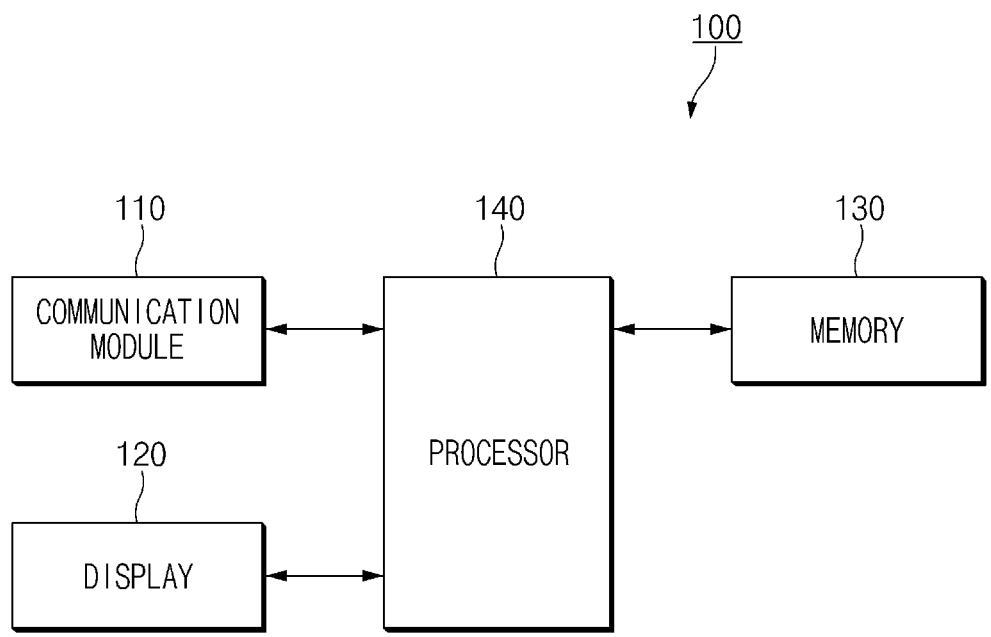
FIG. 4 is a block diagram illustrating a configuration of a display apparatus, according to various exemplary embodiments.

FIG. 4 is a block diagram illustrating a configuration of a display apparatus, according to various exemplary embodiments.

Referring to FIG. 4, the display apparatus 100 may include a communication module 110, a display 120, a memory 130, and a processor 140.

According to an exemplary embodiment, the communication module 110 (or a communication circuit) may communicate with an external device. For example, the communication module 110 may receive an image (e.g., a video image) from the external device. According to an exemplary embodiment, the communication module 110 may communicate with the input device 200. For example, the communication module 110 may receive an image captured by the input device 200, pattern information, and/or information about input coordinates from the input device 200. According to an exemplary embodiment, the communication module 110 may include either or both of a wired communication module and a wireless communication module.

According to an exemplary embodiment, the display 120 may display the image. According to an exemplary embodiment, the display 120 may display an image to which the pattern information has been added. For example, the display 120 may display a plurality of image frames at a predetermined frame rate, and at least a subset of a plurality of image frames displayed on the display 120 may include the pattern information.

According to an exemplary embodiment, the memory 130 may store the pattern information. For example, the pattern information stored in the memory 130 may include the number of pieces of pattern information and information about an added position. According to an exemplary embodiment, the memory 130 may store the image (e.g., a video image). For example, the memory 130 may include a nonvolatile memory such as a flash memory or a hard disk.

According to an exemplary embodiment, the processor 140 may control overall operations of the display apparatus 100. For example, the processor 140 may add the pattern information to the image according to various exemplary embodiments by controlling each of the communication module 110, the display 120, and the memory 130.

According to an exemplary embodiment, the display apparatus 100 may include at least one processor 140. For example, the display apparatus 100 may include a plurality of the processors 140, each of which executes at least one function. According to an exemplary embodiment, the processor 140 may be implemented with a system on chip (SoC) that includes any of a central processing unit (CPU), a graphic processing unit (GPU), a memory, and the like.

According to an exemplary embodiment, the processor 140 may display the image on the display 120. For example, the processor 140 may display the image, which is received from the external device via the communication module 110, or the image stored in the memory 130 on the display 120.

According to an exemplary embodiment, the processor 140 may add the pattern information to the image displayed on the display 120. For example, the processor 140 may add the pattern information to the image based on the pattern information stored in the memory 130. According to an exemplary embodiment, the processor 140 may add the pattern information to at least a subset of a plurality of image frames displayed on the display 120. For example, the processor 140 may add the pattern information to all the plurality of image frames. For another example, the processor 140 may periodically add the pattern information to a subset (e.g., one of three image frames) of the plurality of image frames.

According to an exemplary embodiment, if a pattern adding function is turned on, the processor 140 may add the pattern information to the image. According to an exemplary embodiment, the processor 140 may turn on/off the pattern adding function based on a user input received via an input module (not illustrated). According to an exemplary embodiment, in a state where the pattern adding function is turned off, if an image (or pattern information) displayed on the display 120 or coordinate information is received from the input device 200, the processor 140 may turn on the pattern adding function. For example, in a state where the pattern adding function is turned off, if the image (or pattern information) or the coordinate information is received from the input device 200, the processor 140 may determine that a user is operating the input device 200, and thus may turn on the pattern adding function. According to an exemplary embodiment, in a state where the pattern adding function is turned on, if the image (or pattern information) or the coordinate information is not received from the input device 200 during a predetermined time interval (e.g., three seconds), the processor 140 may turn off the pattern adding function.

According to an exemplary embodiment, the processor 140 may add pattern information to the image by changing a pixel value of at least one of a plurality of pixels included in an image. According to an exemplary embodiment, the processor 140 may divide the image into a plurality of pattern blocks, each of which includes a respective plurality of pixels. According to an exemplary embodiment, the processor 140 may add unique pattern information to each respective pattern block of the plurality of pattern blocks. For example, the processor 140 may add the pattern information to at least one of a plurality of pixels included in one pattern block, and the positions and the numbers of pixels to which the pattern information is added may be different, in each of the plurality of pattern blocks.

According to an exemplary embodiment, when changing a pixel value of a pixel included in the image, the processor 140 may change the pixel value from an original pixel value to a pixel value that falls within a predetermined range. As such, while the change in an original image is minimized, a pattern may be added to the image.

Hereinafter, various exemplary embodiments in which pattern information is added to an image will be described below with reference to FIGS. 5, 6A, 6B, 7, and 8.

Figure 5:
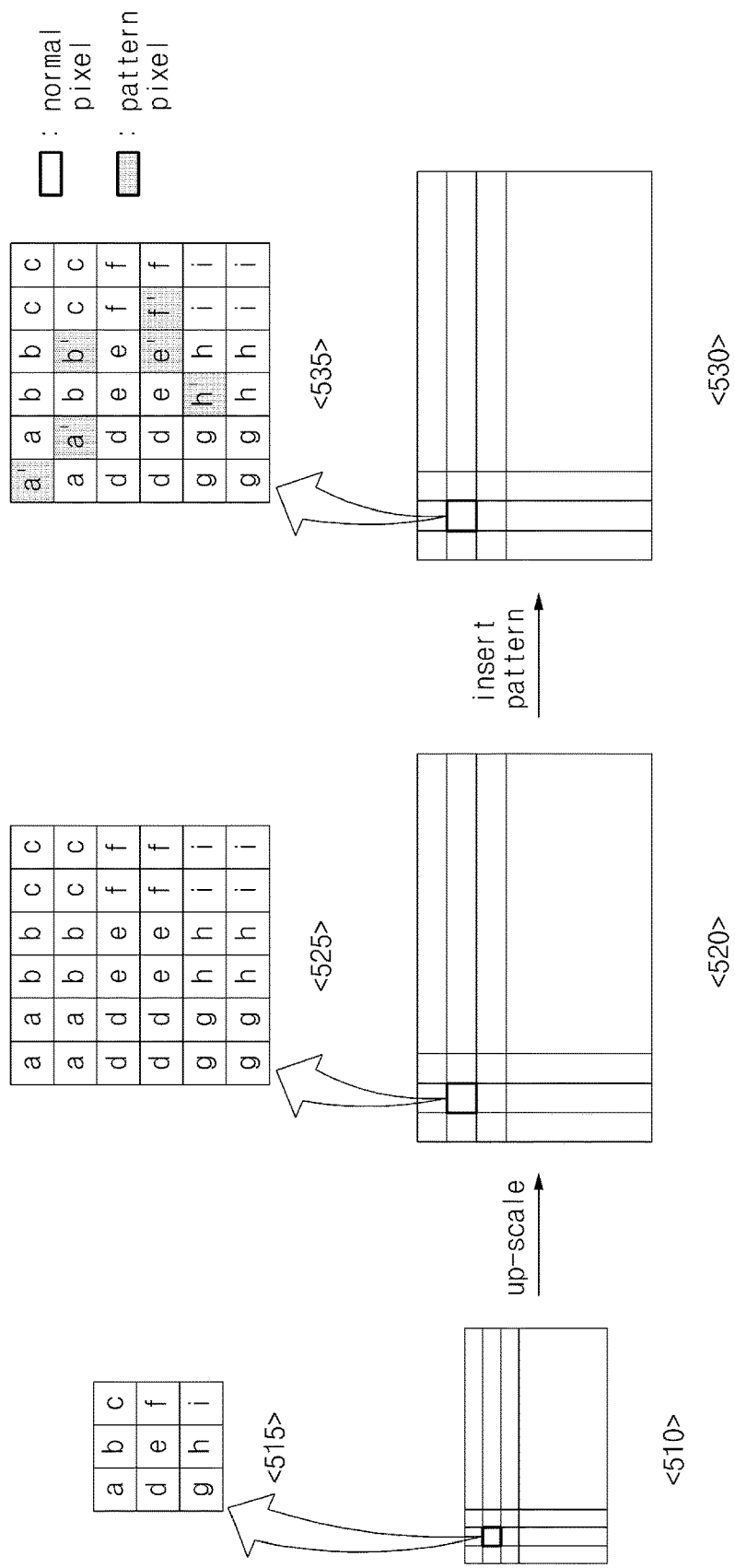
FIG. 5 is a diagram illustrating a method of adding pattern information to an image, according to an exemplary embodiment.

FIG. 5 is a diagram illustrating a method of adding pattern information to an image, according to an exemplary embodiment.

Image 510 of FIG. 5 may indicate an image prior to an up-scale operation (i.e., an operation to increase the size of the image by a scale factor). Image 520 of FIG. 5 may indicate the up-scaled image. Image 530 of FIG. 5 may indicate an image to which the pattern information is added.

According to an exemplary embodiment, the processor 140 may scale up an image, i.e., increase the size of the image by a scale factor. For example, the processor 140 may scale up an image from an image of a full-HD (FHD) resolution (1920×1080) to an image of an ultra-HD (UHD) resolution (3840×2160). Referring to image 515 obtained by enlarging one pattern block included in image 510 of FIG. 5, prior to the up-scaling operation, the one pattern block may include 3×3 pixels. Referring to image 525 obtained by enlarging one pattern block included in image 520 of FIG. 5, after the up-scaling operation, the one pattern block may include 6×6 pixels.

According to an exemplary embodiment, the processor 140 may scale up an image by generating additional pixels, each of which has a same pixel value as an adjacent one of a plurality of pixels, at a periphery of the plurality of pixels included in the image. For example, referring to image 525 of FIG. 5, three pixels having a same respective pixel value may be additionally generated with respect to each of nine pixels included in image 515 of FIG. 5.

According to an exemplary embodiment, the processor 140 may add the pattern information to the image by changing a pixel value of a subset of a plurality of pixels having the same pixel value. For example, the processor 140 may decrease or increase the pixel value of a subset of the plurality of pixels having the same pixel value by a predetermined value. Referring to image 535 obtained by enlarging the pattern block included in image 530 of FIG. 5, the value of a respective subset of the plurality of pixels having pixel values a, b, e, f, and h may be changed to the values of a', b', e', f', and h', respectively.

According to an exemplary embodiment, the pattern information may include reference position information, first axis (e.g., x-axis) coordinate information, and second axis (e.g., y-axis) coordinate information. According to an exemplary embodiment, the processor 140 may add the reference position information such that the reference position information is distinguished from other pattern information. For example, the processor 140 may change pixel values of two of the plurality of pixels having the same pixel value in order to add the reference position information, and may change a pixel value of one of the plurality of pixels having the same pixel value in order to add coordinate information (e.g., the first axis coordinate information and the second axis coordinate information). Referring to image 535 of FIG. 5, pixel values of two of four pixels having a pixel value of "a" may be changed to a'. The two pixels for which the respective value changed to a' may include the reference position information. A value of one of four pixels respectively having pixel values of b, e, f and h may be changed to b', e', f' and h', respectively. Pixels for which the respective value is changed to b', e', f' or h' may include the coordinate information.

Figure 6A:
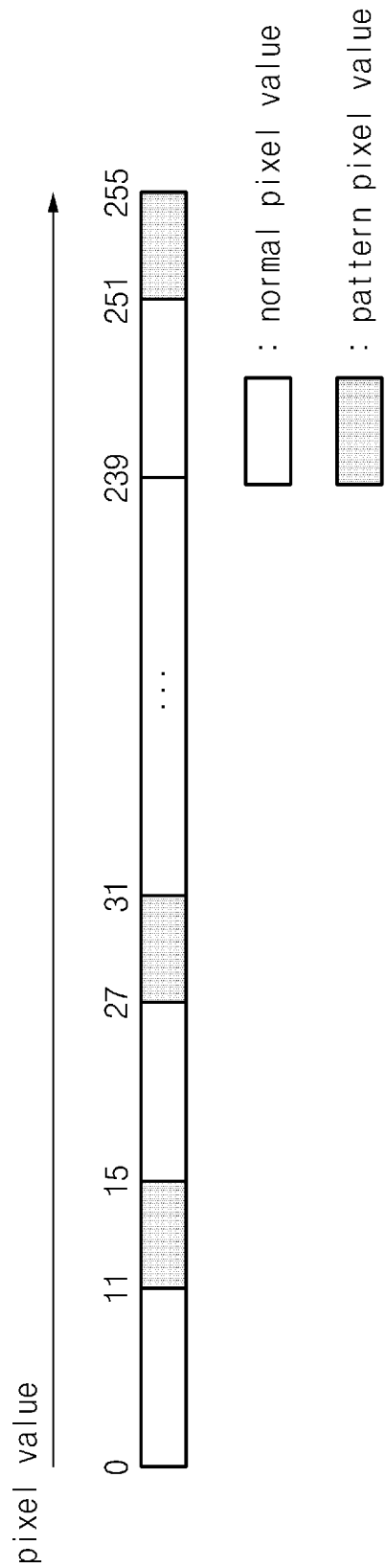
FIG. 6A is a diagram illustrating a type of a pixel value, according to an exemplary embodiment.

FIG. 6A is a diagram illustrating a type of a pixel value, according to an exemplary embodiment.

According to an exemplary embodiment, a pixel value of a pixel included in an image may include a normal pixel value that does not include pattern information and a pattern pixel value that includes the pattern information.

Referring to FIG. 6A, in the case where the pixel value is represented by 8 bits, for example, one pixel may have a pixel value of 0 to 255. The pixel value of 0 to 255 may alternately include a normal pixel value group and a pattern pixel value group. For example, pixel values of 0 to 11 may indicate the normal pixel values. Pixel values of 12 to 15 may indicate the pattern pixel values. Pixel values of 16 to 27 may indicate the normal pixel values. Pixel values of 28 to 31 may indicate the pattern pixel values.

According to an exemplary embodiment, the normal pixel value and the pattern pixel value may be determined by a value of at least one bit from among eight bits that indicate the pixel value. For example, if both values of the third bit and the fourth bit are "1", the pixel value may be set to the pattern pixel value. If a value of at least one of the third bit and the fourth bit is "0", the pixel value may be set to the normal pixel value. For another example, if the value of the third bit is "1", the pixel value may be the pattern pixel value. If the value of the third bit is "0", the pixel value may be the normal pixel value. The normal pixel value and the pattern pixel value may be set in advance by a manufacturer when the display apparatus 100 is manufactured, or may be set based on a user input.

Figure 6B:
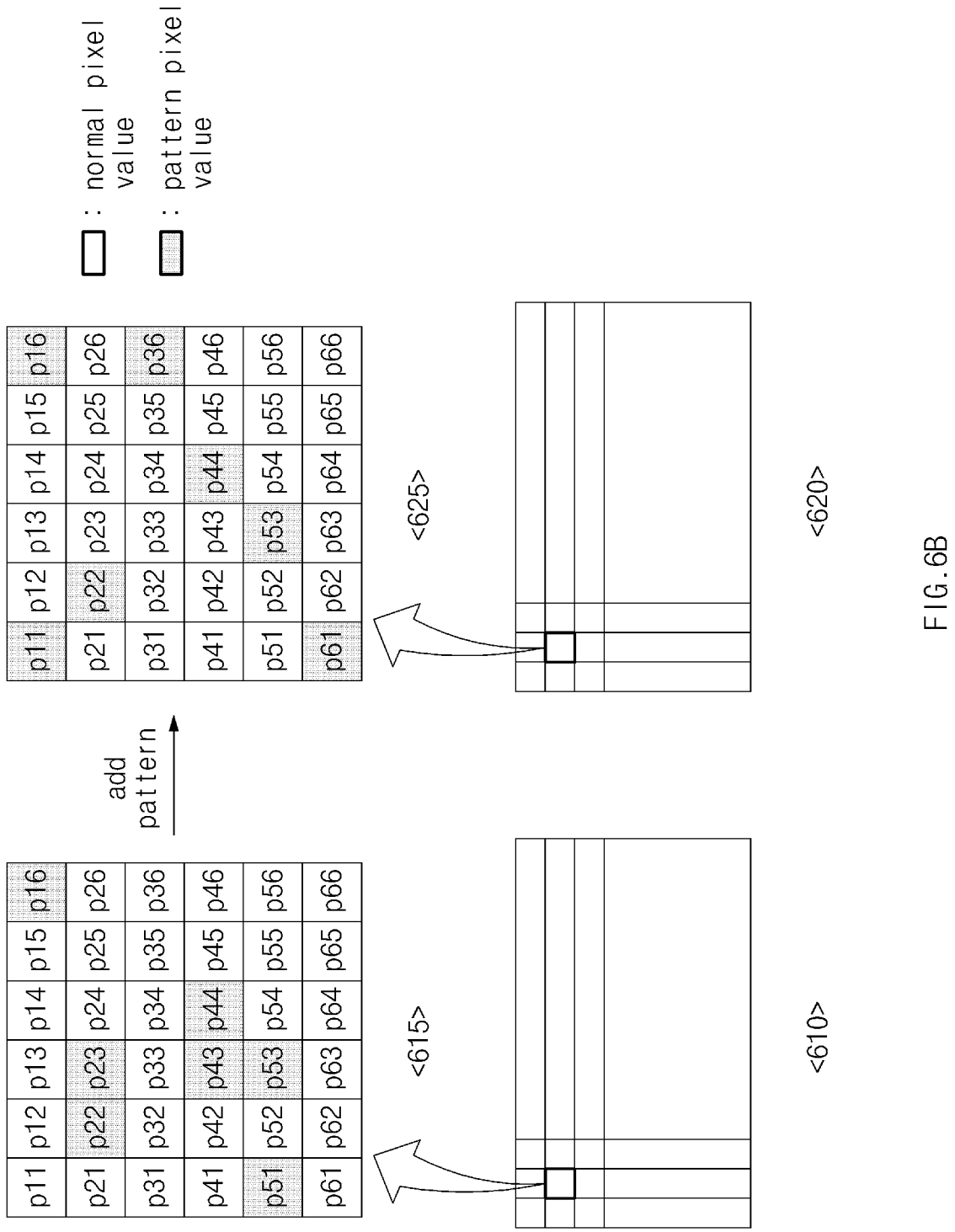
FIG. 6B is a diagram illustrating a method of adding pattern information to an image, according to an exemplary embodiment.

FIG. 6B is a diagram illustrating a method of adding pattern information to an image, according to an exemplary embodiment.

Image 610 of FIG. 6B may indicate an image before the pattern information is added, and image 620 of FIG. 6B may indicate an image to which the pattern information has been added.

Referring to image 615 obtained by enlarging a pattern block included in image 610 of FIG. 6B, a plurality of pixels included in the pattern block may have a normal pixel value or a pattern pixel value. Information about the number and the positions of pixels having the pattern pixel value of pixels included in image 615 may be different from the pattern information stored in the memory 130.

According to an exemplary embodiment, the processor 140 may divide a plurality of pixels included in the image into a first subset of pattern pixels that include the pattern information and a second subset of normal pixels that do not include the pattern information. For example, the processor 140 may divide the plurality of pixels included in the image into the first subset of pattern pixels and the second subset of normal pixels based on the pattern information stored in the memory 130. Referring to image 615 of FIG. 6B, the processor 140 may classify p16, p22, p23, p43, p44, p51, and p53 of a plurality of pixels included in image 615 as belonging to the first subset of pattern pixels, and may classify the remaining pixels as belonging to the second subset of normal pixels.

According to an exemplary embodiment, the processor 140 may change a pixel value of at least one of a plurality of pixels included in the image based on the division result. For example, if the pixel value of the pixel divided into the first subset of pattern pixels is the normal pixel value, the processor 140 may change the normal pixel value to the pattern pixel value. If the pixel value of the pixel divided into the second subset of normal pixels is the pattern pixel value, the processor 140 may change the pattern pixel value to the normal pixel value. Referring to image 625 obtained by enlarging a pattern block included in image 620 of FIG. 6B, the processor 140 may change a pixel value of each of pixels p11, p36, and p61 from the normal pixel value to the pattern pixel value. The processor 140 may change a pixel value of each of pixels p23, p43, and p51 from the pattern pixel value to the normal pixel value.

According to an exemplary embodiment, when changing a pixel value of a pixel included in the image, the processor 140 may change the pixel value from an original pixel value to a pixel value within a predetermined range (e.g., such that each of the original pixel value and the changed pixel value is less than a predetermined value). For example, when changing the pixel value of a pattern pixel from the normal pixel value to the pattern pixel value, the processor 140 may change the pixel value to a pattern pixel value (or a pattern pixel value included in a period of a pattern pixel value closest to the original pixel value) closest to the original pixel value. When changing the pixel value of a normal pixel from the pattern pixel value to the normal pixel value, the processor 140 may change the pixel value to a normal pixel value (or a normal pixel value included in a period of a normal pixel value closest to the original pixel value) closest to the original pixel value.

Figure 7:
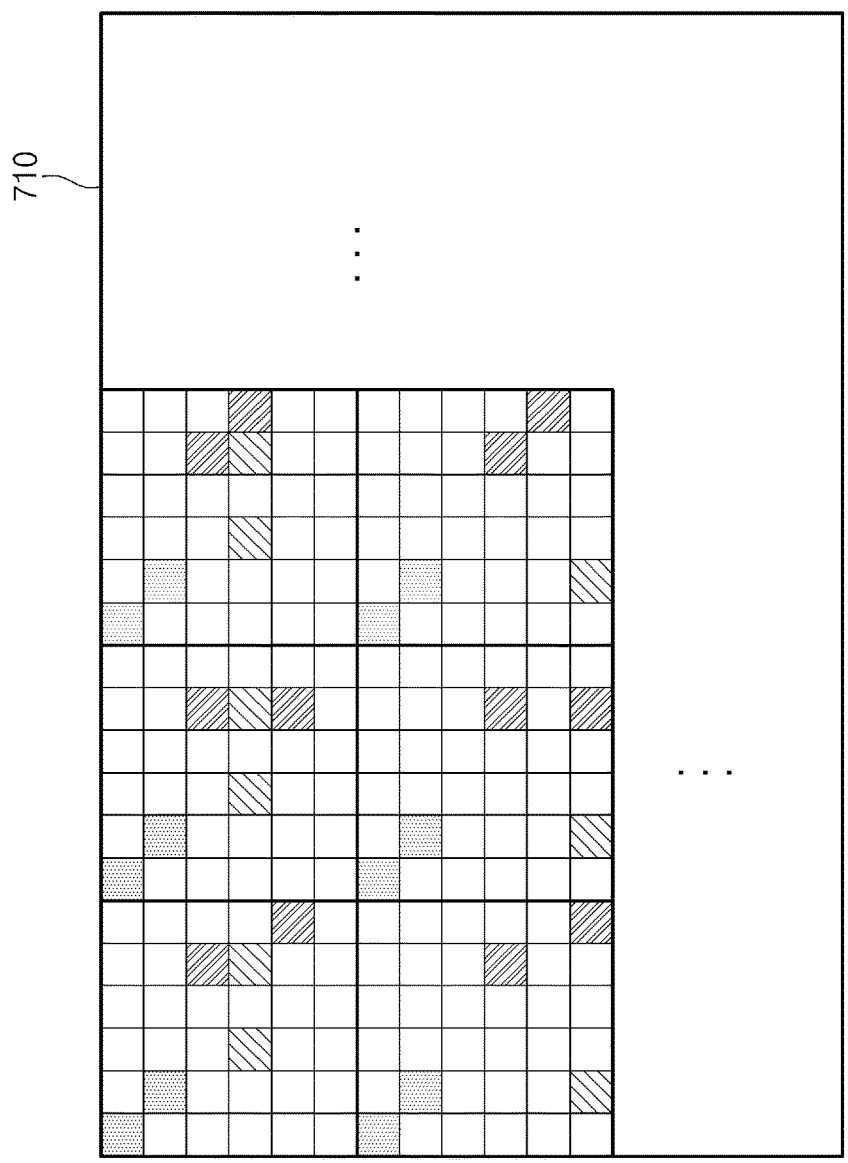
FIG. 7 is a diagram illustrating a method of adding pattern information to an image, according to an exemplary embodiment.

FIG. 7 is a diagram illustrating a method of adding pattern information to an image, according to an exemplary embodiment.

According to an exemplary embodiment, each of a plurality of pixels included in an image 710 may include a respective plurality of sub-pixels. For example, each of the plurality of pixels may include a first sub-pixel for displaying a first color (e.g., red), a second sub-pixel for displaying a second color (e.g., green), and a third sub-pixel for displaying a third color (e.g., blue).

According to an exemplary embodiment, the pattern information may include reference position information, first axis (e.g., x-axis) coordinate information, and second axis (e.g., y-axis) coordinate information. According to an exemplary embodiment, the processor 140 may add different pattern information for each sub-pixel. For example, the processor 140 may add the reference position information to the first sub-pixel, may add the first axis coordinate information to the second sub-pixel, and may add the second axis coordinate information to the third sub-pixel. According to an exemplary embodiment, the processor 140 may change only the pixel value of a sub-pixel, which corresponds to a type of pattern information to be added to a pixel, from among a plurality of sub-pixels included in the pixel. For example, when adding the reference position information, the processor 140 may change only the pixel value of the first sub-pixel of the plurality of sub-pixels included in the pixel. As another example, when adding the first axis coordinate information, the processor 140 may change only the pixel value of the second sub-pixel of the plurality of sub-pixels included in the pixel.

Figure 8:
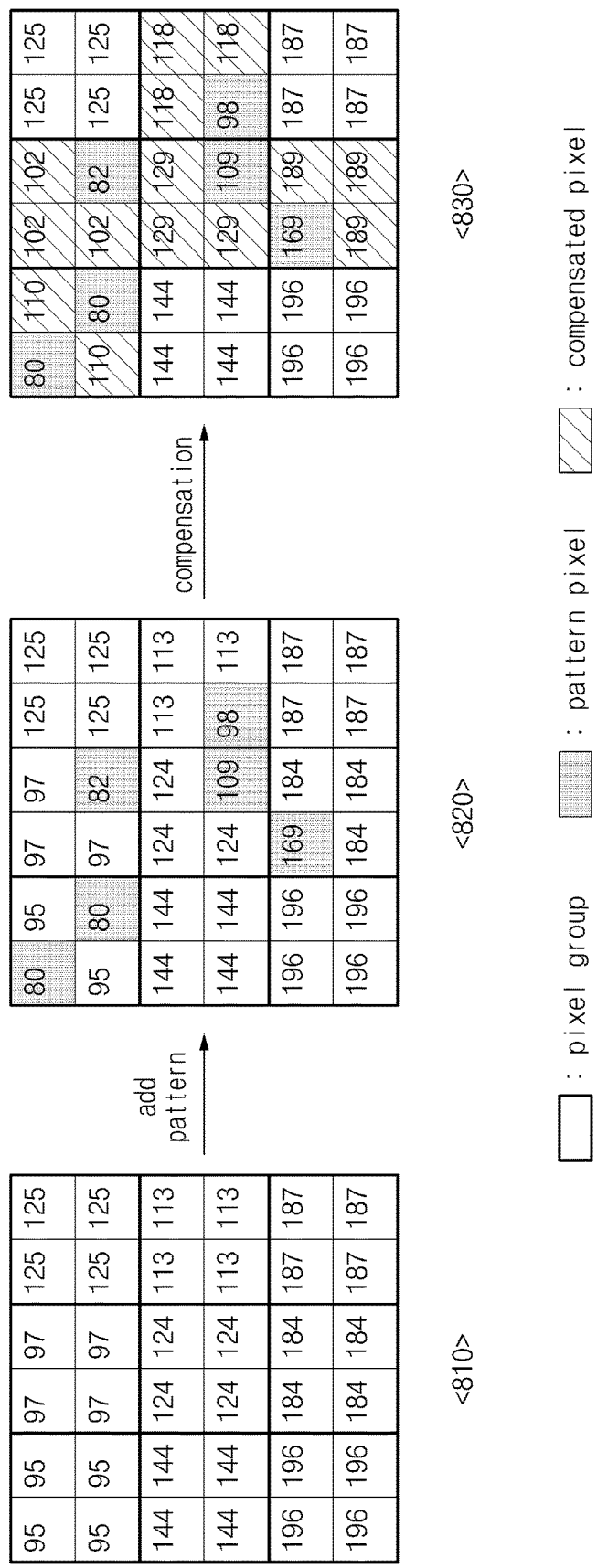
FIG. 8 is a diagram a method of compensating an image in response to adding pattern information, according to an exemplary embodiment.

FIG. 8 is a diagram a method of compensating an image in response to adding pattern information, according to an exemplary embodiment.

Image 810 of FIG. 8 may indicate an image prior to an addition of pattern information. Image 820 of FIG. 8 may indicate an image to which the pattern information has been added. Image 830 of FIG. 8 may indicate an image compensated in response to the adding of the pattern information.

According to an exemplary embodiment, the processor 140 may identify a pixel group that is recognizable by a user as one pixel. For example, referring to image 810, image 820, and image 830 of FIG. 8, the processor 140 may determine four pixels as the pixel group that is recognizable by the user as one pixel.

For example, the pixel group that is recognizable by the user as one pixel may be determined based on any or all of the viewing distance of the user, the visual acuity of the user, the size (e.g., width and height) of the display 120, and the resolution of the display 120. The size and the resolution of the display 120 may not vary based on the user, because the size and the resolution of the display 120 are unique characteristics of the display apparatus 100, but the viewing distance and the visual acuity of the user may vary based on the user. According to an exemplary embodiment, the processor 140 may obtain the viewing distance and the visual acuity of the user through any of various methods. For example, the memory 130 may store information about the pixel group, which is calculated based on a general viewing distance and visual acuity of the user. The processor 140 may identify the pixel group that is recognizable by the user as one pixel based on the information about the pixel group stored in the memory 130. For another example, the display apparatus 100 may receive information about the viewing distance and the visual acuity from the user via an input module (not illustrated). The processor 140 may calculate the pixel group that is recognizable by the user as one pixel, based on the information received via the input module. For another example, the display apparatus 100 may include a distance sensor (not illustrated) that senses the viewing distance of the user. The processor 140 may calculate the pixel group that is recognizable by the user as one pixel, based on the viewing distance of the user sensed by the distance sensor.

According to an exemplary embodiment, if a pixel value of a subset of a plurality of pixels included in the pixel group is changed, the processor 140 may compensate a change in an image due to the adding of the pattern information by changing a pixel value of at least one of the remaining pixels such that the pixel value corresponds to the changed pixel value. For example, referring to image 820 of FIG. 8, the pixel value of each of two pixels included in the pixel group having a pixel value of "95" may be changed to "80". The pixel value of one pixel included in the pixel group having a pixel value of "97" may be changed to "82". The pixel value of one pixel included in the pixel group having a pixel value of "124" may be changed to "109". The pixel value of one pixel included in the pixel group having a pixel value of "113" may be changed to "98". The pixel value of one pixel included in the pixel group having a pixel value of "184" may be changed to "169". Referring to image 830 of FIG. 8, the pixel value of each of the remaining two pixels included in the pixel group having a pixel value of "95" may be changed to "110". The pixel value of each of the remaining three pixels included in the pixel group having a pixel value of "97" may be changed to "102". The pixel value of each of the remaining three pixels included in the pixel group having a pixel value of "124" may be changed to "129". The pixel value of each of the remaining three pixels included in the pixel group having a pixel value of "113" may be changed to "118". The pixel value of each of the remaining three pixels included in the pixel group having a pixel value of "184" may be changed to "189".

According to an exemplary embodiment, as in an exemplary embodiment described above with respect to FIG. 7, in the case where different pattern information is added for each sub-pixel, a pixel value may be compensated with respect to only a sub-pixel that corresponds to the sub-pixel to which the pattern information is added.

Referring to image 810 and image 830 of FIG. 8, the sum of pixel values of a plurality of pixels included in one pixel group may be the same. According to an exemplary embodiment described with reference to FIG. 8, a pixel value of the pixel group that is recognizable by the user as one pixel may not be changed. As such, even though the pattern information is added to an image, the image of the same quality may be provided to the user.

The case where the pixel value of each of all the remaining pixels is changed is described in FIG. 8 to compensate the changed pixel value based on the adding of the pattern information. However, only the pixel value of a part of the remaining pixels may be changed to correspond to the changed pixel value. In addition, the case where pixel values of a plurality of pixels included in the pixel group are the same as each other is exemplified in FIG. 8. However, even though the pixel values of a plurality of pixels included in the pixel group are at least partly different, the above-described compensating method may be applied in the same manner.

According to an exemplary embodiment, the processor 140 may display an image, to which the pattern information is added, on the display 120. For example, the processor 140 may display a plurality of image frames, to each of which the pattern information has been added, at a predetermined frame rate.

According to an exemplary embodiment, the processor 140 may receive an image captured by the input device 200 or pattern information detected from the captured image, from the input device 200 via the communication module 110. For example, the processor 140 may receive an image, within which the pattern information is included, or the pattern information via the communication module 110.

According to an exemplary embodiment, the processor 140 may identify input coordinates (or a function to be executed by the display apparatus 100) of the input device 200 based on the image received from the input device 200 or the received pattern information. According to an exemplary embodiment, the processor 140 may identify a pixel (or a pattern pixel), which includes the pattern information, from among a plurality of pixels included in the received image. For example, the processor 140 may identify a pixel, the pixel value of which is different from each of pixel values of neighboring pixels, from among the plurality of pixels included in the received image. As another example, the processor 140 may identify a pixel, which has the pattern pixel value, from among the plurality of pixels included in the received image. According to an exemplary embodiment, the processor 140 may identify the input coordinates of the input device 200 based on the number and positions of pixels that include the pattern information. For example, the processor 140 may compare the pixel that includes the pattern information with the pattern information stored in the memory 130 in order to identify the input coordinates of the input device 200. As another example, the processor 140 may identify a pattern block by using the reference position information, and may calculate the input coordinates of the input device 200 based on the number and the positions of pattern pixels included in the pattern block.

According to an exemplary embodiment, if the input coordinates of the input device 200 are identified based on the image or the pattern information received from the input device 200, the processor 140 may add the pattern information to a partial area, which corresponds to the identified input coordinates, of an image to be displayed on the display 120. For example, the processor 140 may add the pattern information to only an area of a predetermined size (e.g., horizontal 100 pixels×vertical 100 pixels), which includes the identified input coordinates. In the case where a user touches a specific area of the display 120 by using the input device 200 such that a first coordinate is recognized, since the possibility that a second coordinate to be recognized afterwards is to be recognized at a periphery of the first coordinate is very high, the pattern information may be added to only a peripheral area of input coordinates, thereby decreasing a throughput of the processor 140.

According to an exemplary embodiment, in a state where the pattern adding function is turned on, if the input coordinates are not identifiable based on an image received from the input device 200 or the pattern information received from the input device 200, for example, the processor 140 may increase a variation of the pixel value. For example, the case where a pixel that includes the pattern information is not normally recognized due to a capture condition (e.g., ambient brightness, camera performance, or the like) of the input device 200 may occur. As such, if the input coordinates are not identified, the processor 140 may increase the variation of the pixel value, thereby improving the recognition rate of the pixel that includes the pattern information.

According to an exemplary embodiment, if the input coordinates are not identifiable based on an image received from the input device 200 or the pattern information received from the input device 200, the processor 140 may increase the size of each of a normal pixel value group and a pattern pixel value group. For example, referring to FIG. 6A, the size of the normal pixel value group may be "12", and the size of the pattern pixel value group may be "4". If the input coordinates are not identifiable, the processor 140 may increase the size of the normal pixel value group to "24" and may increase the size of the pattern pixel value group to "8".

According to an exemplary embodiment, the processor 140 may receive information about the input coordinates from the input device 200 via the communication module 110. For example, the input device 200 may capture an image displayed on the display 120 and may identify the input coordinates based on the pattern information included in the captured image. According to an exemplary embodiment, the input device 200 may identify the input coordinates in the same manner as the display apparatus 100.

According to an exemplary embodiment, if identifying the input coordinates or if the information about the input coordinates is received from the input device 200, the processor 140 may perform an operation that corresponds to the input coordinates. For example, the processor 140 may display a user interface that corresponds to the input coordinates on the display 120, or may perform a function of the user interface that corresponds to the input coordinates. As another example, the processor 140 may execute an application that corresponds to the input coordinates. As another example, the processor 140 may display a written image that corresponds to the input coordinates on the display 120 or may change an image displayed on the display 120.

Figure 9:
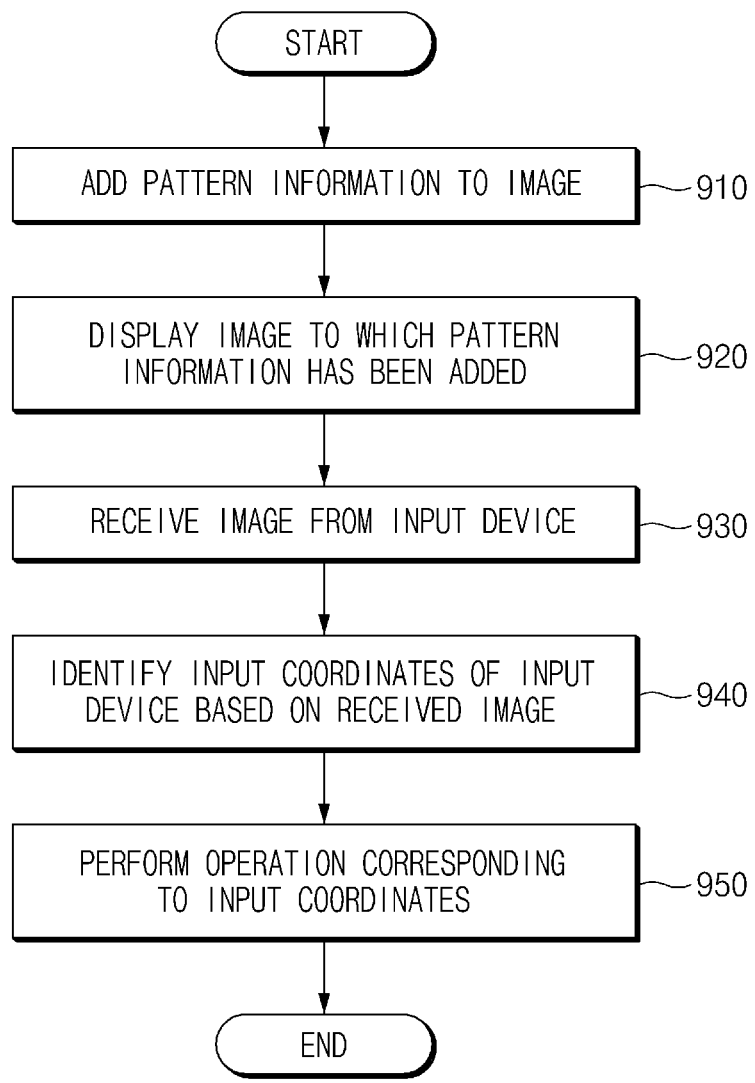
FIG. 9 is a flowchart illustrating an input method of a display apparatus, according to various exemplary embodiments.

FIG. 9 is a flowchart illustrating an input method of a display apparatus, according to various exemplary embodiments.

The flowchart illustrated in FIG. 9 may include operations that the above-described display apparatus 100 processes. Even though omitted below, details about the display apparatus 100 described with reference to FIGS. 1 to 8 may be applied to the flowchart illustrated in FIG. 9.

According to an exemplary embodiment, in operation 910, the display apparatus 100 may add pattern information to an image. According to an exemplary embodiment, the display apparatus 100 may add the pattern information to at least a subset of a plurality of image frames. According to an exemplary embodiment, the display apparatus 100 may change a pixel value of at least one of a plurality of pixels included in the image in order to add the pattern information to the image. According to an exemplary embodiment, the display apparatus 100 may divide the image into a plurality of pattern blocks, each of which includes a plurality of pixels, and may add unique pattern information to each of the plurality of pattern blocks. According to an exemplary embodiment, when changing a value of a pixel included in the image, the display apparatus 100 may change the value from an original pixel value to a pixel value that falls within a predetermined range.

According to an exemplary embodiment, the display apparatus 100 may scale up an image (i.e., increase a size of an image) by generating pixels, each of which has a same pixel value as each of a plurality of pixels, at a periphery of a plurality of pixels included in the image. According to an exemplary embodiment, the display apparatus 100 may add the pattern information to the image by changing a pixel value of a subset of a plurality of pixels having the same pixel value.

According to an exemplary embodiment, the display apparatus 100 may divide a plurality of pixels included in the image into a first subset of pattern pixels, in which the pattern information is included, and a second subset of normal pixels, in which the pattern information is not included. According to an exemplary embodiment, the display apparatus 100 may change a value of at least one pixel of a plurality of pixels included in the image based on the division result. For example, if the pixel value of the pixel divided into the first subset of pattern pixels is the normal pixel value, the display apparatus 100 may change the normal pixel value to the pattern pixel value. If the pixel value of the pixel divided into the second subset of normal pixels is the pattern pixel value, the display apparatus 100 may change the pattern pixel value to the normal pixel value.

According to an exemplary embodiment, the display apparatus 100 may add different pattern information for each sub-pixel. For example, the display apparatus 100 may add the reference position information to the first sub-pixel, may add the first axis coordinate information to the second sub-pixel, and may add the second axis coordinate information to the third sub-pixel.

According to an exemplary embodiment, the display apparatus 100 may identify a pixel group that is recognizable by a user as one pixel. According to an exemplary embodiment, if a pixel value of a subset of a plurality of pixels included in the pixel group is changed, the display apparatus 100 may compensate a change in an image due to the adding of the pattern information by changing a pixel value of at least one of the remaining pixels such that the pixel value corresponds to the changed pixel value.

According to an exemplary embodiment, in operation 920, the display apparatus 100 may display the image, to which the pattern information has been added, in a display. For example, the display apparatus 100 may display a plurality of image frames, to each of which the pattern information has been added, at a predetermined frame rate.

According to an exemplary embodiment, in operation 930, the display apparatus 100 may receive the image or the pattern information from the input device 200. For example, the input device 200 may capture a part of an image displayed in a display of the display apparatus 100 and may transmit the captured image to the display apparatus 100. According to another exemplary embodiment, the display apparatus 100 may receive the pattern information from the input device 200. For example, the input device 200 may detect the pattern information from the captured image and may transmit the detected pattern information to the display apparatus 100.

According to an exemplary embodiment, in operation 940, the display apparatus 100 may identify the input coordinates (or function information) of the input device 200 based on the received image. According to an exemplary embodiment, the display apparatus 100 may identify a pixel (or a pattern pixel), which includes the pattern information, from among a plurality of pixels included in the received image. According to an exemplary embodiment, the display apparatus 100 may identify the input coordinates (or function information) of the input device 200 based on the number and positions of pixels that include the pattern information. According to another exemplary embodiment, the display apparatus 100 may identify the input coordinates (or function information) of the input device 200 based on the pattern information received from the input device 200.

According to an exemplary embodiment, if the input coordinates are not identifiable based on the image or the pattern information received from the input device 200, the display apparatus 100 may increase a variation of the pixel value. According to an exemplary embodiment, if the input coordinates are not identifiable based on the pattern information included in the image received from the input device 200, the display apparatus 100 may increase the size of each of a normal pixel value group and a pattern pixel value group.

According to an exemplary embodiment, in operation 950, the display apparatus 100 may perform an operation that corresponds to the input coordinates (or function information).

Figure 10:
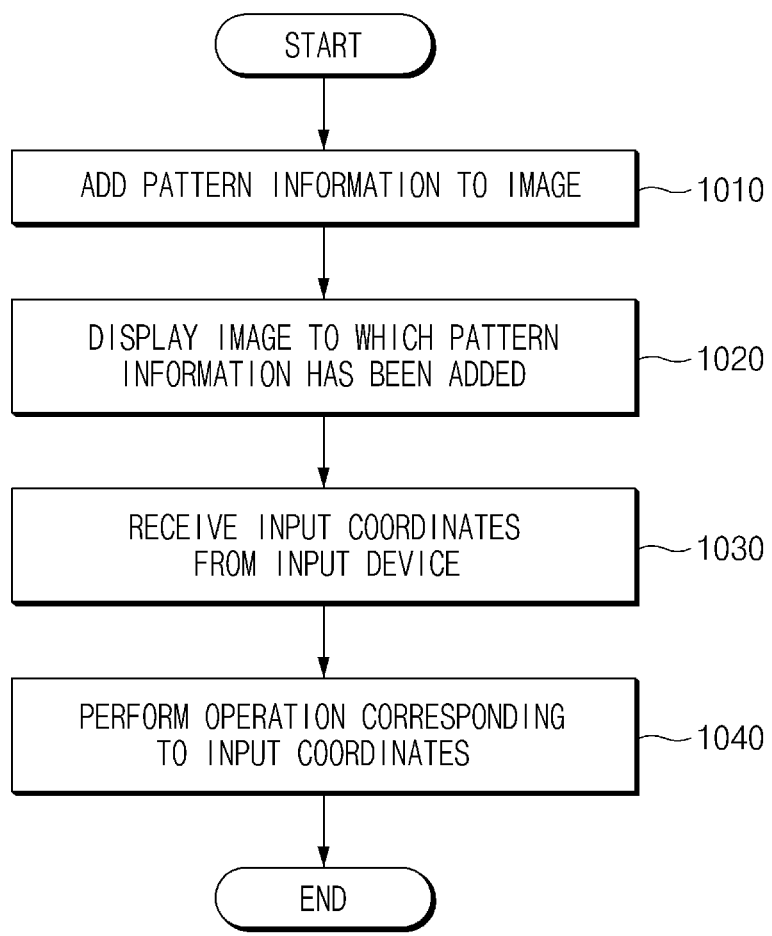
FIG. 10 is a flowchart illustrating an input method of a display apparatus, according to various exemplary embodiments.

FIG. 10 is a flowchart illustrating an input method of a display apparatus, according to various exemplary embodiments.

The flowchart illustrated in FIG. 10 may include operations that the above-described display apparatus 100 processes. Even though omitted below, details about the display apparatus 100 described with reference to FIGS. 1 to 8 may be applied to the flowchart illustrated in FIG. 10.

According to an exemplary embodiment, in operation 1010, the display apparatus 100 may add pattern information to an image. According to an exemplary embodiment, the display apparatus 100 may add the pattern information to at least a subset of a plurality of image frames. According to an exemplary embodiment, the display apparatus 100 may add pattern information to the image by changing a pixel value of at least one of a plurality of pixels included in the image. According to an exemplary embodiment, the display apparatus 100 may divide the image into a plurality of pattern blocks, each of which includes a plurality of pixels, and may add unique pattern information to each of the plurality of pattern blocks. According to an exemplary embodiment, when changing a value of a pixel included in the image, the display apparatus 100 may change the value from an original pixel value to a pixel value that falls within a predetermined range.

According to an exemplary embodiment, the display apparatus 100 may scale up an image (i.e., increase a size of an image) by generating pixels, each of which has a same pixel value as each of a plurality of pixels, at a periphery of a plurality of pixels included in the image. According to an exemplary embodiment, the display apparatus 100 may add the pattern information to the image by changing a pixel value of a subset of a plurality of pixels having the same pixel value.

According to an exemplary embodiment, the display apparatus 100 may divide a plurality of pixels included in the image into a first subset of pattern pixels, in which the pattern information is included, and a second subset of normal pixels, in which the pattern information is not included. According to an exemplary embodiment, the display apparatus 100 may change a value of at least one pixel of a plurality of pixels included in the image based on the division result. For example, if the pixel value of the pixel classified into the first subset of pattern pixels is the normal pixel value, the display apparatus 100 may change the normal pixel value to the pattern pixel value. If the pixel value of the pixel classified into the second subset of normal pixels is the pattern pixel value, the display apparatus 100 may change the pattern pixel value to the normal pixel value.

According to an exemplary embodiment, the display apparatus 100 may add different pattern information for each sub-pixel. For example, the display apparatus 100 may add the reference position information to the first sub-pixel, may add the first axis coordinate information to the second sub-pixel, and may add the second axis coordinate information to the third sub-pixel.

According to an exemplary embodiment, the display apparatus 100 may identify a pixel group that is recognizable by a user as one pixel. According to an exemplary embodiment, if a pixel value of a subset of a plurality of pixels included in the pixel group is changed, the display apparatus 100 may compensate a change in an image due to the adding of the pattern information by changing a pixel value of at least one of the remaining pixels such that the pixel value corresponds to the changed pixel value.

According to an exemplary embodiment, in operation 1020, the display apparatus 100 may display the image, to which the pattern information has been added, in a display. For example, the display apparatus 100 may display a plurality of image frames, to each of which the pattern information has been added, at a predetermined frame rate.

According to an exemplary embodiment, in operation 1030, the display apparatus 100 may receive the input coordinates (or function information) from the input device 200. For example, the input device 200 may capture a part of an image displayed in a display of the display apparatus 100 and may identify the input coordinates (or function information) based on the pattern information included in the captured image.

According to an exemplary embodiment, if the input coordinates are not received from the input device 200 (or if information indicating that it is impossible to calculate the input coordinates is received), the display apparatus 100 may increase a variation of the pixel value. According to an exemplary embodiment, if the input coordinates are not received from the input device 200 (or if the information indicating that it is impossible to calculate the input coordinates is received from the input device 200), the display apparatus 100 may increase the size of each of a normal pixel value group and a pattern pixel value group.

According to an exemplary embodiment, in operation 1040, the display apparatus 100 may perform an operation that corresponds to the input coordinates (or function information).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, any of an application-specific IC (ASIC) chip, a field-programmable gate array (FPGA), and a programmable-logic device for performing some operations, which are known or will be developed.

According to various exemplary embodiments, at least a part of an apparatus (e.g., modules or functions thereof) or a method (e.g., operations) may be, for example, implemented by instructions stored in a transitory or non-transitory computer-readable storage medium in the form of a program module. The instruction, when executed by a processor, may cause the processor to perform a function that corresponds to the instruction. The non-transitory computer-readable recording medium may include any of a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The instruction may include codes created by a compiler or codes that are capable of being executed by a computer by using an interpreter. According to various exemplary embodiments, a module or a program module may include at least one of the above elements, or a part of the above elements may be omitted, or other elements may be further included.

According to various exemplary embodiments, operations executed by modules, program modules, or other elements may be executed by a successive method, a parallel method, a repeated method, or a heuristic method, or at least one part of operations may be executed in different sequences or omitted. Alternatively, other operations may be added. While the present disclosure has been shown and described with reference to various exemplary embodiments thereof, it will be understood by persons having ordinary skill in the art that various changes in form and details may be made therein without departing from the spirit and scope of the present disclosure as defined by the appended claims and their equivalents.

What is claimed is:

1. A display apparatus comprising:
a display;
a communication module configured to communicate with an input device; and
a processor,
wherein the processor is configured to:
add first pattern information to a first image by changing a pixel value of at least one of a first plurality of pixels included in the first image;
display the first image, to which the first pattern information has been added, on the display;
receive a second image captured by the input device from the input device via the communication module; and
identify input coordinates of the input device or a function to be executed by the display apparatus based on second pattern information included in the received second image,
wherein each of the first plurality of pixels includes a respective plurality of sub-pixels,
wherein the first pattern information includes reference position information, first axis coordinate information, and second axis coordinate information, and
wherein the processor is further configured to:
add the reference position information to a first sub-pixel in each respective plurality of sub-pixels;
add the first axis coordinate information to a second sub-pixel in each respective plurality of sub-pixels; and
add the second axis coordinate information to a third sub-pixel in each respective plurality of sub-pixels.

2. The display apparatus of claim 1, wherein the processor is further configured to:
divide the first image into a plurality of pattern blocks, wherein each of the plurality of pattern blocks includes a respective plurality of pixels; and
add unique pattern information to each of the plurality of pattern blocks.

3. The display apparatus of claim 1, wherein the processor is further configured to:
identify the input coordinates of the input device or the function based on a number and positions of first pixels that include the second pattern information, from among a second plurality of pixels included in the received second image.

4. The display apparatus of claim 1, wherein the processor is further configured to:
identify a pixel group that is recognizable by a user as one pixel; and in response to a pixel value of a first pixel from among a plurality of pixels included in the pixel group being changed, change a pixel value of at least a second pixel from among the plurality of pixels included in the pixel group so as to correspond to the changed pixel value.

5. The display apparatus of claim 1, wherein the processor is further configured to:
in response to the input coordinates or the function not being identifiable based on the second pattern information, increase a variation of the pixel value.

6. The display apparatus of claim 1, wherein the processor is further configured to:
increase a size of the first image by generating additional pixels, each of the additional pixels having a same respective pixel value as an adjacent one of the first plurality of pixels, at a periphery of the first plurality of pixels included in the first image; and
change a pixel value of at least one pixel from among a set of pixels that have a same pixel value.

7. The display apparatus of claim 1, wherein the pixel value includes a normal pixel value that does not include the first pattern information, and a pattern pixel value that includes the first pattern information, and
wherein the processor is further configured to:
divide each of the first plurality of pixels included in the first image into a respective pattern pixel that includes the first pattern information and a respective normal pixel that does not include the first pattern information;
in response to a pixel value of the respective pattern pixel being the normal pixel value, change the normal pixel value to the pattern pixel value; and
in response to a pixel value of the respective normal pixel being the pattern pixel value, change the pattern pixel value to the normal pixel value.

8. The display apparatus of claim 1, wherein the processor is further configured to:
when changing the pixel value, change the pixel value from an original pixel value to a pixel value that is within a predetermined range.

9. The display apparatus of claim 1, wherein the processor is further configured to:
in response to the input coordinates being identified, change a pixel value of at least one of pixels that are included in an area that corresponds to the input coordinates, from among the first plurality of pixels included in the first image; and
add the first pattern information to the first image.

10. An input method that is executable by a display apparatus, the method comprising:
adding first pattern information to a first image by changing a pixel value of at least one of a first plurality of pixels included in the first image;
displaying the first image, to which the first pattern information has been added, in a display;
receiving a second image captured by an input device from the input device via a communication module;
identifying input coordinates of the input device or a function to be executed by the display apparatus based on second pattern information included in the received second image,
wherein each of the first plurality of pixels includes a respective plurality of sub-pixels,
wherein the first pattern information includes reference position information, first axis coordinate information, and second axis coordinate information, and
wherein the adding the first pattern information to the first image includes:
adding the reference position information to a first sub-pixel in each respective plurality of sub-pixels;
adding the first axis coordinate information to a second sub-pixel in each respective plurality of sub-pixels; and
adding the second axis coordinate information to a third sub-pixel in each respective plurality of sub-pixels.

11. The method of claim 10, wherein the adding the first pattern information to the first image includes:
dividing the first image into a plurality of pattern blocks, wherein each of the plurality of pattern blocks includes a respective plurality of pixels; and
adding unique pattern information to each of the plurality of pattern blocks.

12. The method of claim 10, wherein the identifying the input coordinates includes:
identifying the input coordinates of the input device or the function based on a number and positions of first pixels that include the second pattern information, from among a plurality of pixels included in the received second image.

13. The method of claim 10, further comprising:
identifying a pixel group that is recognizable by a user as one pixel; and
in response to a pixel value of a first pixel from among a plurality of pixels included in the pixel group being changed, changing a pixel value of at least a second pixel from among the plurality of pixels included in the pixel group so as to correspond to the changed pixel value.

14. The method of claim 10, further comprising:
in response to the input coordinates or the function not being identifiable based on the second pattern information, increasing a variation of the pixel value.

15. The method of claim 10, wherein the adding the first pattern information to the first image includes:
increasing a size of the first image by generating additional pixels, each of the additional pixels having a same respective pixel value as an adjacent one of the first plurality of pixels, at a periphery of the first plurality of pixels included in the first image; and
changing a pixel value of at least one pixel from among a set of pixels that have a same pixel value.

16. The method of claim 11, wherein the pixel value includes a normal pixel value that does not include the first pattern information, and a pattern pixel value that includes the first pattern information, and
wherein the adding the first pattern information to the first image includes:
dividing each of the first plurality of pixels included in the first image into a respective pattern pixel that includes the first pattern information and a respective normal pixel that does not include the first pattern information;
in response to a pixel value of the respective pattern pixel being the normal pixel value, changing the normal pixel value to the pattern pixel value; and
in response to a pixel value of the respective normal pixel being the pattern pixel value, changing the pattern pixel value to the normal pixel value.

17. The method of claim 10, wherein the adding the first pattern information to the first image includes:
when changing the at least one pixel value, changing the at least one pixel value from an original pixel value to a pixel value that is within a predetermined range.

18. A non-transitory computer-readable recording medium having recorded thereon a program performing a method, the method comprising:

adding first pattern information to a first image by changing a pixel value of at least one of a plurality of pixels included in the first image;

displaying the first image, to which the first pattern information has been added, in a display of a display apparatus;

receiving a second image captured by an input device from the input device via a communication module;

identifying input coordinates of the input device based on second pattern information included in the received second image, wherein each of the first plurality of pixels includes a respective plurality of sub-pixels, wherein the first pattern information includes reference position information, first axis coordinate information, and second axis coordinate information, and wherein the adding the first pattern information to the first image includes:

adding the reference position information to a first sub-pixel in each respective plurality of sub-pixels;

adding the first axis coordinate information to a second sub-pixel in each respective plurality of sub-pixels; and adding the second axis coordinate information to a third sub-pixel in each respective plurality of sub-pixels.

* * * * *